US008215573B2

(12) United States Patent
Hornby

(10) Patent No.: US 8,215,573 B2
(45) Date of Patent: Jul. 10, 2012

(54) AUTOMOTIVE GASOLINE SOLENOID DOUBLE POLE DIRECT INJECTOR

(75) Inventor: Michael J. Hornby, Williamsburg, VA (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 225 days.

(21) Appl. No.: 12/779,984

(22) Filed: May 14, 2010

(65) Prior Publication Data

US 2011/0278368 A1 Nov. 17, 2011

(51) Int. Cl.
*F02M 51/06* (2006.01)
*F02M 51/00* (2006.01)
*F16K 31/02* (2006.01)

(52) U.S. Cl. ...... 239/585.2; 239/5; 239/585.1; 239/900; 251/129.15

(58) Field of Classification Search ........ 239/5, 585.1–585.5, 900; 251/129.01, 251/129.15, 129.16; 123/472
See application file for complete search history.

(56) References Cited

U.S. PATENT DOCUMENTS

| | | | |
|---|---|---|---|
| 6,367,769 B1 | 4/2002 | Reiter | |
| 6,523,759 B1 * | 2/2003 | D'Arrigo | 239/585.1 |
| 2003/0141475 A1 * | 7/2003 | Ruthardt et al. | 251/129.16 |
| 2007/0114299 A1 * | 5/2007 | Scheffel | 239/88 |
| 2007/0194152 A1 * | 8/2007 | Abe et al. | 239/585.2 |
| 2009/0242667 A1 * | 10/2009 | Pusch et al. | 239/533.2 |
| 2009/0288640 A1 | 11/2009 | Shingu et al. | |

FOREIGN PATENT DOCUMENTS

| | | |
|---|---|---|
| DE | 19756103 A1 | 6/1999 |
| DE | 19948238 A1 | 4/2001 |
| DE | 102007000353 A1 | 1/2008 |
| EP | 1820958 A2 | 8/2007 |
| EP | 2077389 A1 | 7/2009 |
| JP | 2009281291 A | 12/2009 |
| WO | 99/31379 A1 | 6/1999 |

OTHER PUBLICATIONS

International Search Report dated Jan. 16, 2012 from corresponding International Patent Application No. PCT/US2011/036428.

* cited by examiner

*Primary Examiner* — Darren W Gorman

(57) ABSTRACT

A direct fuel injector (10) includes a body (12) having a passage between inlet and outlet ends. A seat (16) is at the outlet end and a closure member (28) is associated with the seat. A needle member (30) is associated with the closure member and is movable with respect to a pole piece (35) between a first, closed position and a second, open position. A spring (42) biases the needle member to the first position. An armature (32) is free-floating with respect to the needle member. An intermediate pole structure (38) is coupled with the needle member and is disposed between the pole piece and the armature and is decoupled there-from. An armature stop (40) is coupled to the needle member and is spaced from the intermediate pole structure. An electromagnetic coil (46) is associated with the pole piece, intermediate pole structure and armature. The injector reduces bounce of the needle assembly.

19 Claims, 3 Drawing Sheets

AUTOMOTIVE GASOLINE SOLENOID DOUBLE POLE DIRECT INJECTOR

FIELD

The invention relates to a fuel injector for supplying gasoline to an engine and, more particularly, to a fuel injector having an intermediate pole to increase the speed and force generated within the injector solenoid while adding an anti-bounce mechanism within the injector.

BACKGROUND

Conventional direct injection solenoid fuel injectors have anti-bounce mechanisms to limit bouncing of the armature and thus inadvertent opening of the injector. However, these conventional mechanisms cause closing of the injector to be generally slow or the magnetic force generated is not high enough for new, higher pressure applications. Another disadvantage of prior techniques is the configuration of the components for manufacturing. These conventional direct injectors are not configured in a modular manner and thus, cannot be built and tested in modular stages. This results in scrap during manufacturing and thus increases cost.

Thus, there is a need to provide a modular, anti-bounce, solenoid direct fuel injector that provides an increased speed of opening and can be calibrated and tested on a sub-assembly basis.

SUMMARY

An objective of the present invention is to fulfill the need referred to above. In accordance with the principles of an embodiment, this objective is obtained by a direct fuel injector for an internal combustion engine including a body having a passage extending along a longitudinal axis between inlet and outlet ends. A seat is at the outlet end and a closure member is associated with the seat. A needle member is associated with the closure member and is movable with respect to a pole piece between a first position and a second position such that in the first position, the needle member engages the closure member so that the closure member engages the seat to close the outlet end, and in the second position, the needle member is in a position permitting the closure member to disengage from the seat, opening the outlet end. A spring biases the needle member to the first position. An armature is constructed and arranged to be free-floating with respect to the needle member. An intermediate pole structure is coupled with the needle member and disposed between the pole piece and the armature and decoupled from both the armature and the pole piece. An armature stop is coupled to the needle member and spaced from the intermediate pole structure. An electromagnetic coil is associated with the pole piece, intermediate pole structure and armature. The coil, when energized, is constructed and arranged to provide magnetic flux that accelerates the armature to impact the intermediate pole structure with the intermediate pole structure impacting the pole piece moving the needle member to the second position, with the armature bouncing with respect to the intermediate pole structure instead of the needle assembly bouncing with respect to the seat. When the coil is de-energized, removing the magnetic flux, the intermediate pole structure and the armature are constructed and arranged to move away from the pole piece with the spring biasing the needle member to the first position, with the armature engaging the armature stop causing the armature to bounce with respect to the armature stop instead of the needle member bouncing with respect to the seat.

In accordance with another aspect of and embodiment, a method is provided for controlling bounce in a direct fuel injector having a seat at an outlet end of the injector, a closure member associated with the seat, a pole piece, electromagnetic coil, and a needle member movable with respect to the pole piece between a first position and a second position such that in the first position, the needle member engages the closure member so that the closure member engages the seat to close the outlet end, and in the second position, the needle member is in a position permitting the closure member to disengage from the seat, opening the outlet end. The method provides an armature to be free-floating with respect to the needle member and an intermediate pole structure coupled with the needle member and disposed between the pole piece and the armature and decoupled from both the armature and the pole piece. When the coil is energized and magnetic flux accelerates the armature to impact the intermediate pole structure, with the intermediate pole structure impacting the pole piece moving the needle member to the second position, the method ensures that the armature bounces with respect to the intermediate pole structure instead of the needle member bouncing with respect to the seat. When the coil is de-energized to remove the magnetic flux, causing the intermediate pole structure and the armature to move away from the pole piece and causing the needle member to move to the first position, the method ensures that the armature impacts and bounces off an armature stop instead of the needle member bouncing with respect to the seat.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
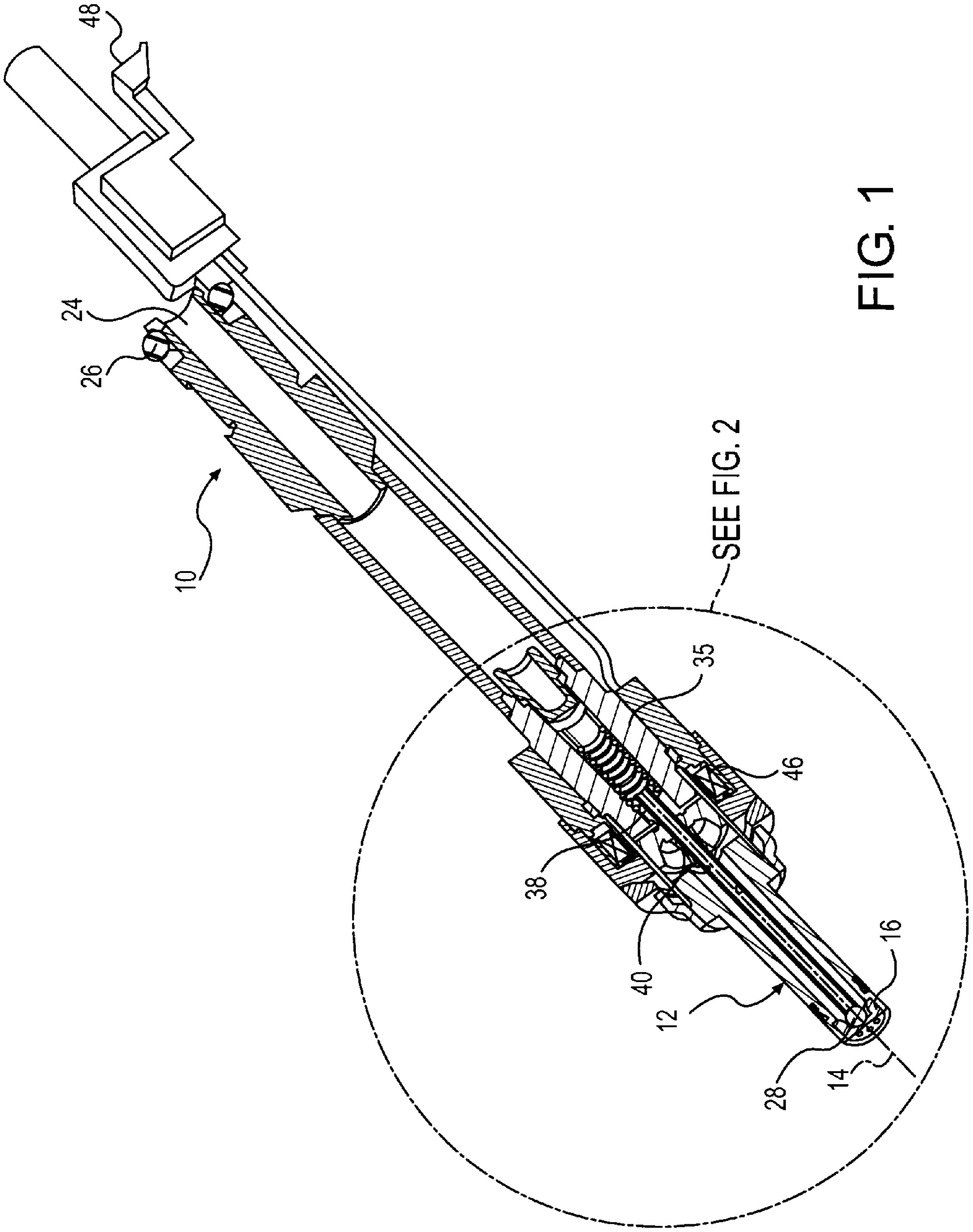
FIG. 1 is a perspective view, partially in section of a solenoid double pole direct fuel injector according to an embodiment of the invention.
Figure 2:
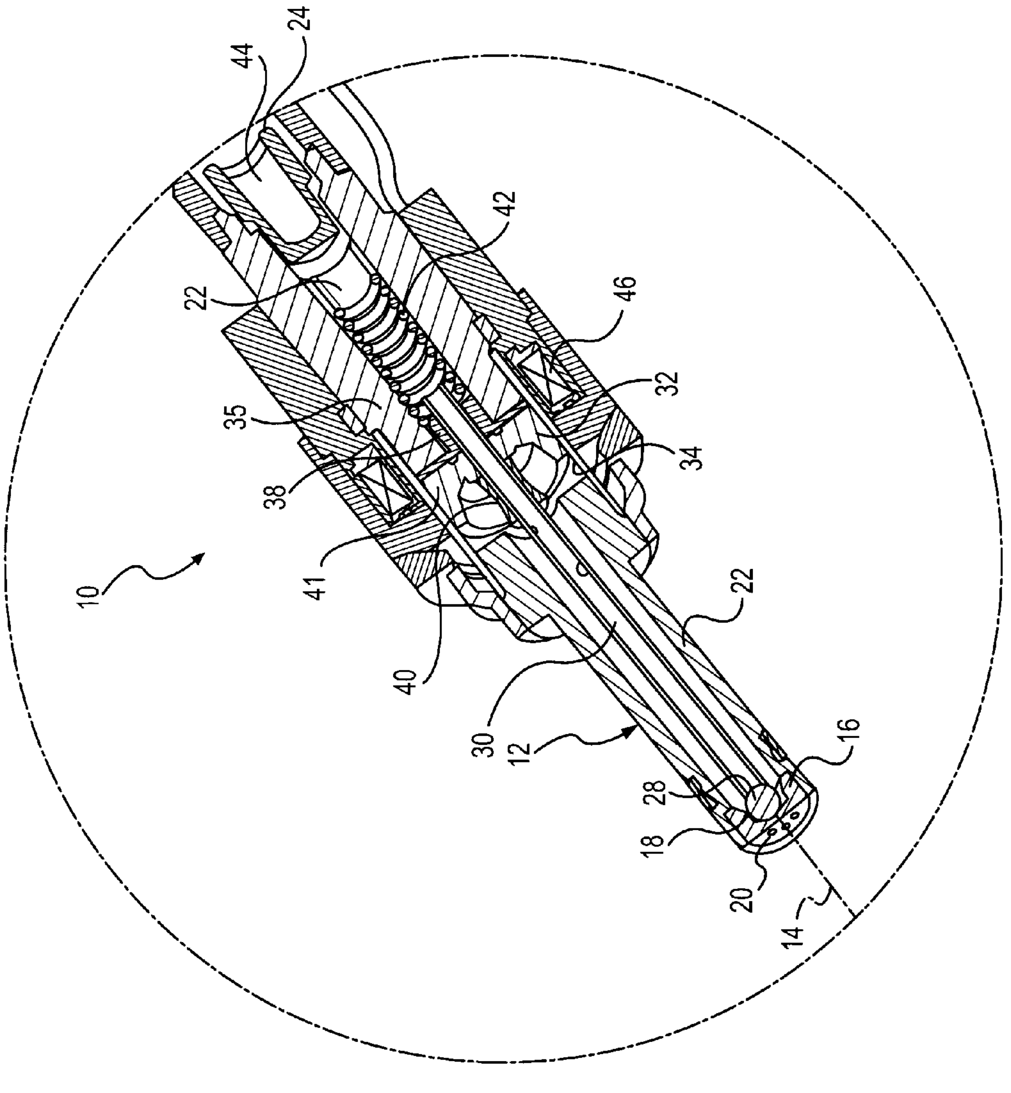
FIG. 2 is an enlarged view of the portion of the fuel injector encircled in FIG. 1.

Referring to FIGS. 1 and 2, a solenoid actuated, double pole, direct fuel injector, generally indicated at 10, which can be of the so-called top feed type, supplies fuel such as gasoline to an internal combustion engine (not shown). The fuel injector 10 includes a valve body, generally indicated at 12, extending along a longitudinal axis 14. The valve body 12 includes a valve seat 16 defining a seating surface 18, which can have a frustoconical or concave shape, facing the interior of the valve body 12. The seating surface 18 includes at least one fuel outlet opening 20 preferably centered on the longitudinal axis 14 and in communication with an inlet tube 22 for conducting pressurized fuel into the valve body 12 against the seating surface 18. A proximal portion of the inlet tube 22 defines an inlet end 24 of the injector 10. An O-ring 26 (FIG. 1) is used to seal the inlet end 24 in a fuel rail (not shown).

A closure member, e.g., a spherical valve ball 28, within the injector 10 is moveable between a first, seated or closed position and a second, open position. In the closed position, the valve ball 28 is urged against the seating surface 18 to close the outlet opening 20 to prevent fuel flow. In the open position, the ball 28 is spaced from the seating surface 18 to allow fuel flow through the outlet opening 20.

Figure 3:
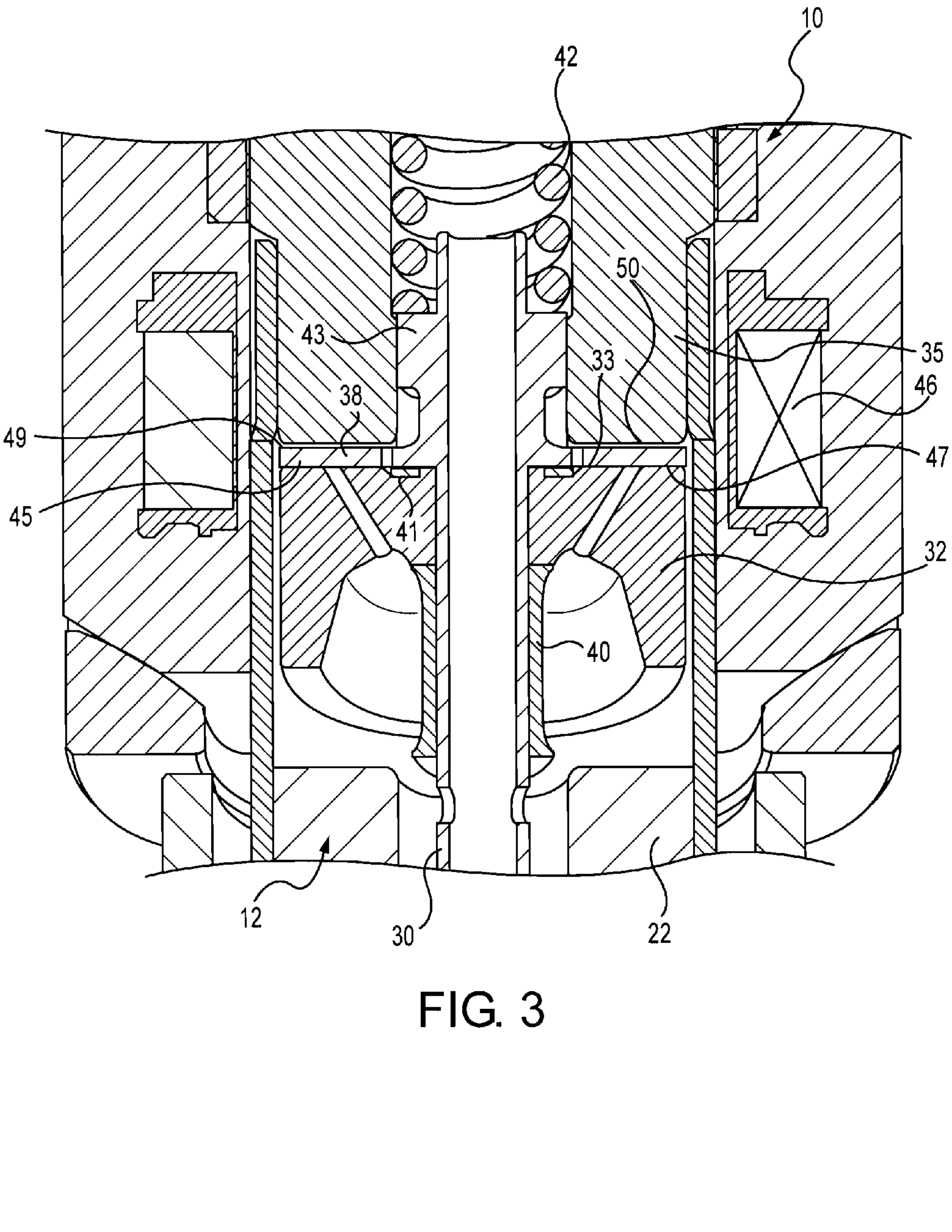
FIG. 3 is an enlarged sectional view of a portion of the direct fuel injector of FIG. 2, showing an intermediate pole and wave spring associated with the armature.

A needle member 30, preferably in the form of a tube, is disposed in the inlet tube 22 on the axis 14. A generally cylindrical armature 32 is moveable along axis 14 in a tube portion 34 of the valve body 12. The armature 32 is free-floating and thus is not connected to the needle member 30. The armature 32 includes a generally planar end surface 33. A pole piece 35 is associated with the armature 32 in the conventional manner. In a first position, an end 36 of the needle member 30 engages with the valve ball 28 so that the valve ball 28 engages the seating surface 18 in the closed position of the valve ball 28. The valve ball 28 can be considered to be part of the needle member 30. An intermediate pole structure 38 and an armature stop 40 are welded to the needle member 30 for movement therewith. The armature stop 40 is spaced from the intermediate pole structure 38. The intermediate pole structure 38 includes a reduced diameter portion 43 that is welded to the needle member 30 and a larger diameter portion 45 extending from the portion 43. The larger diameter portion 45 has opposing planar surfaces 47, 49, defining impact surfaces, the function of which will be explained below. An annular wave spring 41 is provided between the armature 32 and the intermediate pole structure 38 (e.g., surface 47 thereof) to decouple the armature 32 from the intermediate pole structure 38. As best shown in FIG. 3, the needle member passes through the intermediate pole structure 38, the wave spring 41, the armature 32 and the armature stop 40.

A spring 42 engages the intermediate pole structure 38 and thus biases the needle member 30 and the valve ball 28 towards the closed position. The fuel injector 10 may be calibrated by preloading spring 42 to a desired biasing force. A filter 44 is provided within the tube 24 to filter fuel.

As best shown in FIG. 3, an electromagnetic coil 46 surrounds a pole piece or stator 35 formed of a ferromagnetic material. The electromagnetic coil 46 is DC operated and powered via electrical connector 48. The electromagnetic coil 46 is operable to produce magnetic flux when energized such that a magnetic field is built between the armature 32, the intermediate pole structure 38, and the pole piece 35. This creates a magnetic force on the armature 32 that accelerates the armature 32 to impact the intermediate pole structure 38. In particular, the planar surface 33 of the armature 32 engages the planar surface 47 of the intermediate pole structure 38. The impact force is higher than just the magnetic force due to the acceleration of the armature 32. Advantageously, this greater force creates an injector 10 that can operate at higher pressures. After the armature 32 impacts the intermediate pole structure 38, the injector 10 is driven open. Full opening is achieved when the planar surface 49 of the larger diameter portion 45 of the intermediate pole structure 38 impacts the planar end 50 of the pole piece 35. This causes the end 36 of the needle member 30 to move to the second position, away from the seating surface 18, permitting the valve ball 28 to disengage from the seating surface 18. In conventional direct injectors, this impact would cause unwanted bounce of the needle member 30 with respect to the seating surface 18. However, in the embodiment, the needle member 30 does not bounce since the armature 32 is allowed to bounce off the intermediate pole structure 38. The mass of the armature 32 is decoupled from that of needle member/intermediate pole structure.

On closing of the injector 10, the coil 46 is de-energized, removing the magnetic field and allowing the intermediate pole structure 38 and the armature 32 to move away from the pole piece 35. The spring 42 biases the intermediate pole structure 38 and thus the needle member 30 towards first position thereof and an impact occurs between the end 36 of the needle member 30 and the valve ball 28. In conventional direct injectors, the needle member would bounce off the valve ball 28 causing the valve ball 28 to disengage from the seating surface 18, allowing for a secondary, unwanted injection. In the embodiment, advantageously, the travel of the armature 32 with respect to the needle member 30 is limited, via engagement of the armature 32 with the armature stop 40, reducing the amount of energy that can cause a secondary bounce of the needle member 30. Further, the bounce of the armature 32 against the armature stop 40 removes energy so that any bounce of the needle member 30 with respect to the seat 18 is prevented or limited. As noted above, the wave spring 41 decouples the intermediate pole structure 38 (and thus the needle member 30) from the armature 32.

Thus, the provision of the intermediate pole structure 38 associated with the armature 32 increases the speed of opening of the injector 10 due to the impact of the armature 32 and the intermediate pole structure 38. Since there is a large impact area between the armature 32, intermediate pole structure 38 and the pole piece 35, wear and durability of the injector are improved. The coil 46, spring 42, needle member 30, armature 32, pole piece 35, intermediate pole structure 38 and armature stop 40 define a modular sub-assembly of the injector 10 allowing the injector to be calibrated and tested on a sub-assembly basis.

Thus, the injector 10 has a more powerful opening force compared to conventional injectors, has a stronger closing spring for better leakage capability, and eliminates bounce on both opening and closing. The flow performance is improved due to faster opening and closing and by the elimination of secondary injection by reducing or eliminating bounce of the needle member 30.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A direct fuel injector for an internal combustion engine, comprising:

a body having a passage extending along a longitudinal axis between inlet and outlet ends;

a seat at the outlet end;

a closure member associated with the seat, a pole piece;

a needle member associated with the closure member and movable with respect to the pole piece between a first position and a second position such that in the first position, the needle member engages the closure member so that the closure member engages the seat to close the outlet end, and in the second position, the needle member is in a position permitting the closure member to disengage from the seat, opening the outlet end;

a spring biasing the needle member to the first position;

an armature constructed and arranged to be free-floating with respect to the needle member;

an intermediate pole structure coupled with the needle member and disposed between the pole piece and the armature and decoupled from both the armature and the pole piece;

an armature stop coupled to the needle member and spaced from the intermediate pole structure; and an electromagnetic coil associated with the pole piece, intermediate pole structure and armature, the coil, when energized, being constructed and arranged to provide magnetic flux that accelerates the armature to impact the intermediate pole structure with the intermediate pole structure impacting the pole piece moving the needle member to the second position, with the armature bouncing with respect to the intermediate pole structure instead of the needle assembly bouncing with respect to the seat, and when the coil is de-energized, removing the magnetic flux, the intermediate pole structure and the armature are constructed and arranged to move away from the pole piece with the spring biasing the needle member to the first position, with the armature engaging the armature stop causing the armature to bounce with respect to the armature stop instead of the needle member bouncing with respect to the seat.

2. The fuel injector of claim 1, wherein the intermediate pole structure includes a small diameter portion and a larger diameter portion extending there-from, the larger diameter portion having opposing planar surfaces defining first and second impact surfaces of the intermediate pole structure.

3. The fuel injector of claim 2, wherein the armature is generally cylindrical having a planar end surface constructed and arranged to engage the first impact surface of the intermediate pole structure.

4. The fuel injector of claim 3, wherein the pole piece has a planar end constructed and arranged to engage the second impact surface of the intermediate pole structure.

5. The fuel injector of claim 1, further comprising a wave spring between the intermediate pole structure and the armature.

6. The fuel injector of claim 1, wherein the closure member is a valve ball.

7. The fuel injector of claim 1, wherein the spring engages the intermediate pole structure.

8. The fuel injector of claim 1, wherein the pole piece, the needle member, the spring, the armature, the intermediate pole structure, the armature stop and the coil define a modular sub-assembly of the injector that is constructed and arranged to be tested on a sub-assembly basis.

9. A direct fuel injector for an internal combustion engine, comprising:

a body having a passage extending along a longitudinal axis between inlet and outlet ends;

a seat at the outlet end;

means, associated with the seat, for closing the outlet end:

a pole piece;

means for controlling the means for closing, the means for controlling being movable with respect to the pole piece between a first position and a second position such that in the first position, the means for controlling engages the means for closing so that the means for closing engages the seat to close the outlet end, and in the second position, the means for controlling is in a position permitting the means for closing to disengage from the seat, opening the outlet end;

means for biasing the means for controlling to the first position;

an armature constructed and arranged to be free-floating with respect to the means for controlling;

means, coupled with the means for controlling, for receiving an impact of the armature, the means for receiving an impact being disposed between the pole piece and the armature and decoupled from both the armature and the pole piece;

means for stopping movement of the armature coupled to the means for controlling; and an electromagnetic coil associated with the pole piece, means for receiving an impact and the armature, the coil, when energized, being constructed and arranged to provide magnetic flux that accelerates the armature to impact the means for receiving an impact with the means for receiving an impact in turn impacting the pole piece, moving the means for controlling to the second position, with the armature bouncing with respect to the means for receiving an impact instead of the means for controlling bouncing with respect to the seat, and when the coil is de-energized removing the magnetic flux, the means for receiving an impact and the armature are constructed and arranged to move away from the pole piece with the means for biasing forcing the means for controlling to the first position, with the armature engaging the means for stopping causing the armature to bounce with respect to the means for stopping instead of the means for controlling bouncing with respect to the seat.

10. The fuel injector of claim 9, wherein the means for receiving and impact is an intermediate pole structure that includes a small diameter portion and a larger diameter portion extending there-from, the larger diameter portion having opposing planar surfaces defining first and second impact surfaces of the intermediate pole structure.

11. The fuel injector of claim 10, wherein the armature is generally cylindrical having a planar end surface constructed and arranged to engage the first impact surface of the intermediate pole structure.

12. The fuel injector of claim 11, wherein the pole piece has a planar end constructed and arranged to engage the second impact surface of the intermediate pole structure.

13. The fuel injector of claim 9, further comprising a wave spring between the means for receiving an impact and the armature.

14. The fuel injector of claim 9, wherein the means for closing is a valve ball.

15. The fuel injector of claim 9, wherein the means for controlling is a tube-shaped needle member.

16. The fuel injector of claim 9, wherein the means for biasing is a spring that engages the means for receiving an impact.

17. A method of controlling bounce in a direct fuel injector having a seat at an outlet end of the injector, a closure member associated with the seat, a pole piece, electromagnetic coil, and a needle member movable with respect to the pole piece between a first position and a second position such that in the first position, the needle member engages the closure member so that the closure member engages the seat to close the outlet end, and in the second position, the needle member is in a position permitting the closure member to disengage from the seat, opening the outlet end, the method comprising the steps of:

providing an armature to be free-floating with respect to the needle member, providing an intermediate pole structure coupled with the needle member and disposed between the pole piece and the armature and decoupled from both the armature and the pole piece;

when the coil is energized and magnetic flux accelerates the armature to impact the intermediate pole structure, with the intermediate pole structure impacting the pole piece moving the needle member to the second position, the armature bounces with respect to the intermediate pole structure instead of the needle member bouncing with respect to the seat, and when the coil is de-energized to remove the magnetic flux, causing the intermediate pole structure and the armature to move away from the pole piece and causing the needle member to move to the first position, the armature impacts and bounces off an armature stop instead of the needle member bouncing with respect to the seat.

18. The method of claim 17, wherein the armature stop is coupled with the needle member and is spaced from the intermediate pole structure.

19. The method of claim 17, wherein the armature is decoupled from the intermediate pole structure by providing a wave spring there-between.

* * * * *